United States Patent

[11] 3,577,707

[72] Inventor Trevor Raymond White
 Pontypool, England
[21] Appl. No. 886,784
[22] Filed Dec. 19, 1969
[45] Patented May 4, 1971
[73] Assignee Imperial Chemical Industries Limited
 London, England
[32] Priority Dec. 30, 1968
[33] Great Britain
[31] 61,660/68

[54] SORPTION
 9 Claims, No Drawings
[52] U.S. Cl...................................................... 55/68,
 55/74, 55/387, 55/523, 55/524, 55/528
[51] Int. Cl......................................................... B01d 53/02
[50] Field of Search........................................... 23/2.1, 356;
 55/68, 74, 179, 387

[56] References Cited
UNITED STATES PATENTS
2,578,674 12/1951 Daniels et al. ................. 55/68X
2,647,822 8/1953 Pike ............................. 55/74X
2,992,895 7/1961 Feustel et al.................. 23/2X Primary Examiner—Samih N. Zaharna
Assistant Examiner—R. W. Burks
Attorney—Cushman, Darby & Cushman ABSTRACT: A process for sorbing nitrogen dioxide from a gaseous mixture with air, nitrous oxide or other gases by contact with a polyamide material such as polyhexamethylene adipamide in fibrous, powder or sintered form. The polyamide fibers may also be in bicomponent form wherein one component possesses potentially adhesive properties.

SORPTION

The present invention relates to sorption and more particularly to the sorption of nitrogen dioxide by polyamides.

In the commercial exploitation of both organic and inorganic gases it is often found necessary to reduce the level of those gaseous impurities which may detrimentally interfere with such exploitation until they fall within tolerable limits, and depending upon the gas and/or its impurities, numerous techniques are now available to industry for meeting such requirements.

It is well known, however, that the task of removing impurities is frequently one of diminishing returns; greater and greater effort and cost being required to further and to further purify the product. Thus, while it is relatively easy to achieve, say 90 percent purity of the product, to achieve 99 percent purity may be quite a different matter, often requiring expensive and sophisticated purifying techniques and apparatus.

These considerations, amongst others, are equally applicable to the removal of nitrogen dioxide from other gases when its presence as an impurity reaches undesirable levels.

Since nitrogen dioxide is a very poisonous gas, and is created by a number of industrial and even domestic processes, its presence in the atmosphere, albeit in small amounts, may constitute a significant hazard to health particularly in some industrial and heavily populated areas. Indeed, it can be tolerated by humans only to a level of about 5 p.p.m. in air.

There have also been recorded cases of deaths of hospital and dental patients which have been attributed to nitrogen dioxide contamination of the nitrous oxide/oxygen anesthetic gas mixture.

Accordingly, relatively cheap yet effective means for reducing to within tolerable limits the level of nitrogen dioxide in other gases would have considerable merit and ready acceptance by industry in general.

It has been found, most unexpectedly, that such requirements are readily met by the exposure of the nitrogen dioxide contaminated gas or gases to a polyamide material which quickly and effectively sorbs the nitrogen dioxide.

Thus, the present invention comprises a process for sorbing gaseous nitrogen dioxide by contacting the gas with a polyamide material.

The invention further comprises a process in which nitrogen dioxide contaminated gas or gases is/are contacted with a polyamide material in order to reduce the amount of nitrogen dioxide originally present in the mixture.

Preferably, polyamide materials are used which are in the form of fibers powders or sintered porous structures. Of these polyamide forms, fibrous bundles derived from continuous mono- or multi-filament yarns or staple fibers have been found particularly useful. In this context, bicomponent polyamide fibers may be mentioned where one component possesses potentially adhesive properties and where a bundle of such fibers can thus be compacted into a coherent and stable filter medium.

Primarily, it is intended that the invention be used for the removal of nitrogen dioxide from such gaseous media as air, nitrous oxide and other gases which are nonreactive at normal temperatures with the sorption media.

Both homo- and co-polyamides are applicable to this invention and of particular interest there may be mentioned structures derived from polyhexamethylene adipamide, polyhexamethylene suberamide, polyhexamethylene suberamide or polycaprolactam, or from copolymers consisting of two or more of these polymers.

It is emphasized that a particular value of the present invention is in the reduction to even lower levels of trace amounts of nitrogen dioxide in other gases.

The following examples illustrate but do not limit the present invention.

A mixture of 220 p.p.m. (v/v) of nitrogen dioxide in air was made by the deliberate controlled injection of a small known volume of nitrogen dioxide from a commercial supply cylinder into a large known volume of air. The mixture was then passed at room temperature and at a rate of 45 ml/min. through two 25 cm. long, 20 mm. diameter glass columns connected in series each packed with 10 gms. of 15 denier monofilament yarn derived from polyhexamethylene adipamide. After running for a few minutes in order to sweep residual air from the apparatus, the gas mixture issuing from the end of the first column was sampled and analyzed.

It was found to contain 18 p.p.m. (v/v) of nitrogen dioxide. After passing through the second column the concentration of nitrogen dioxide in the mixture was reduced to 2 p.p.m. (v/v), (i.e. 99 percent sorption).

EXAMPLE 2

Nitrogen dioxide was injected into a flow of nitrous oxide from a supply cylinder at such a rate as to give a concentration of 215 p.p.m. (v/v) of nitrogen dioxide in the gas mixture. The mixture was then passed at room temperature and at a rate of 14 ml/min. through a 40 cm. long, 15 mm. diameter glass column packed with a 10 gm. of 15 denier monofilament yarn derived from polyhexamethylene adipamide. After running for a few minutes in order to sweep residual air from the apparatus, the gas mixture issuing from the end of the column was sampled and analyzed. It was found to contain 5 p.p.m. (v/v) of nitrogen dioxide, (i.e. 98 percent sorption).

In the case of the 15 denier polyhexamethylene adipamide monofilament yarn used in the above Examples, the efficiency of sorption was found to increase with the weight of the polyamide yarn in the column up to about 4 gms. The percentage sorption then remained fairly constant.

Repeating the above Examples with a 10 gram sample of 15 denier polyhexamethylene adipamide monofilament yarn that had been treated in the usual manner with conventional spin finishes did not result in any significant change in the efficiency of nitrogen dioxide sorption.

After thirty runs using the same 10 gram sample of 15 denier polyhexamethylene adipamide monofilament yarn under the conditions of Example 2, no significant change in the efficiency of nitrogen dioxide sorption was found to have occurred.

The analytical procedure used to determine the nitrogen dioxide was based on the spectrophotometric measurement (at 525 $\mu$) of the pink colored azo dye formed by the diazotization of sulfanilic acid with the nitrogen dioxide in the gas mixture (via sodium nitrite) followed by coupling with 1-naphthylamine 7-sulfonic acid. A calibration graph was conveniently effected using a standard solution of sodium nitrite.

Alternatively, a similar method of analysis may have been employed which is described by Salzman, Analytical Chemistry, 1954, 26, 1949.

I claim:
1. A process for sorbing gaseous nitrogen dioxide by contacting the gas with a polyamide material.
2. A process according to claim 1 in which nitrogen dioxide contaminated gas is contacted with a polyamide material.
3. A process according to claim 2 in which a mixture of nitrogen dioxide with air is contacted with a polyamide material.
4. A process according to claim 2 in which a mixture of nitrogen dioxide with nitrous oxide is contacted with a polyamide material.
5. A process according to claim 1 in which the polyamide is in fibrous form.
6. A process according to claim 5 in which bicomponent polyamide fibers are employed where one component possesses potentially adhesive properties.
7. A process according to claim 1 in which the polyamide is in powder form.
8. A process according to claim 1 in which the polyamide is in the form of a sintered porous structure.
9. A process according to claim 1 in which the polyamide is polyhexamethylene adipamide.